US007220394B2

(12) United States Patent
Sreeram et al.

(10) Patent No.: US 7,220,394 B2
(45) Date of Patent: May 22, 2007

(54) PROCESS FOR SIMULTANEOUS RECOVERY OF CHROMIUM AND IRON FROM CHROMITE ORE PROCESSING RESIDUE

(75) Inventors: Kalarical Janardhanan Sreeram, Chennai (IN); Thirumalachari Ramasami, Chennai (IN)

(73) Assignee: Council of Scientific and Industrial Research, New Delhi (IN)

( * ) Notice: Subject to any disclaimer, the term of this patent is extended or adjusted under 35 U.S.C. 154(b) by 897 days.

(21) Appl. No.: 10/300,540

(22) Filed: Nov. 20, 2002

(65) Prior Publication Data

US 2004/0086438 A1 May 6, 2004

(30) Foreign Application Priority Data

Oct. 30, 2002 (IN) .................. 1093/DEL/2002

(51) Int. Cl.
*C01G 37/00* (2006.01)
(52) U.S. Cl. ...................................... 423/53; 423/150.1
(58) Field of Classification Search ..................... None
See application file for complete search history.

(56) References Cited

U.S. PATENT DOCUMENTS

| 3,859,412 | A |   | 1/1975  | Okabe et al. .................. 423/61   |
|-----------|---|---|---------|-----------------------------------------|
| 3,937,785 | A |   | 2/1976  | Gancy et al. .................. 423/53   |
| 4,500,350 | A |   | 2/1985  | Meussdoerffer et al. ........... 75/1    |
| 4,504,321 | A |   | 3/1985  | Kapland et al. ............ 106/117      |
| 4,668,483 | A |   | 5/1987  | Ladd et al. .................... 423/53  |
| 4,954,168 | A | * | 9/1990  | Crnojevich et al. ............ 423/55    |
| 4,966,760 | A | * | 10/1990 | Ladd et al. .................... 423/53  |
| 5,395,601 | A |   | 3/1995  | Situ et al. ..................... 423/54 |
| 6,053,963 | A |   | 4/2000  | Graves, Jr. .................... 75/695  |
| 6,379,636 | B2 | * | 4/2002 | Arroyo et al. ............... 423/141    |

FOREIGN PATENT DOCUMENTS

SU 218322SC 6/2002

OTHER PUBLICATIONS

Meegoda, et al.: "Remediation of Chromium-Contaminated Soils—Pilot-Scale Investigation", *Practice Periodical of Hazardous, Toxic, and Radioactive Waste Management*, 4(1):7-15 (Jan. 2000).
Meegoda, et al.: "Construction Use of Vitrified Chromium-Contaminated Soils", *Practice Periodical of Hazardous, Toxic, and Radioactive Waste Management*, 4(3):89-98 (Jul. 2000).
Richmond J. Bartlett: "Chromium Cycling in Soils and Water: Links, Gaps, and Methods", *Environmental Health Perspectives*, vol. 92, pp. 17-24, (1991).
Sreeram, et al.: "Speciation and recovery of chromium from chromite ore processing residues", *J. Envrion. Monit.*, 3, 526-530 (2001).
J.G. Former, et al.: "Assessment and Modeling of the Environmental Chemistry and Potential for Remediative Treatment of Chromium-Contaminated Land", *Environmental Geochemistry and Health*, 21 (4):331-337 (Dec. 1999).
Andrew S. Hursthouse: "The relevance of speciation in the remediation of soils and sediments contaminated by metallic elements-an overview and examples from Central Scotland, UK", *J. Environ. Monit.*, 3(1) (2001).
Grant Darrie: "Commercial Extraction Technology and Process Waste Disposal in the Manufacture of Chromium Chemicals From Ore", *Environmental Geochemistry and Health*, 23:187-193 (2001).
Burke et al.: "Chromite Ore Processing Residue in Hudson County, New Jersey", *Environmental Health Perspectives*, vol. 92, pp. 131-137 (1991).

* cited by examiner

*Primary Examiner*—Stanley S. Silverman
*Assistant Examiner*—Paul Wartalowicz
(74) *Attorney, Agent, or Firm*—Drinker Biddle & Reath LLP; Daniel A. Monaco

(57) ABSTRACT

The present invention relates to a process for simultaneous recovery of chromium and iron from Chromite Ore Processing Residue (COPR) and more particularly, the present invention relates to an economical and environment-friendly process for recovering chromium as a chromate salt and iron as an iron salt from non-leachable Chromite Ore Processing Residue and avoids landfilling of toxic metals.

8 Claims, No Drawings

PROCESS FOR SIMULTANEOUS RECOVERY OF CHROMIUM AND IRON FROM CHROMITE ORE PROCESSING RESIDUE

FIELD OF THE INVENTION

The present invention relates to a process for simultaneous recovery of chromium and iron from Chromite Ore Processing Residue (COPR). More particularly, the present invention relates to a process for recovering chromium as a chromate salt and iron as an iron salt from non-leachable Chromite Ore Processing Residue. The process of the present invention provides an economical and environment-friendly process for recovery of chromium and iron and avoids landfilling of toxic metals.

BACKGROUND AND PRIOR ART DESCRIPTION

Chromite Ore Processing Residue (COPR) is an industrial waste material generated during the manufacture of chromates from chromite ore. In chromite, chromium exists in the trivalent state as chromium iron oxide ($FeCrO_4$). In this state, the chromium is inert and is not soluble in water.

As reported by Nriagu and Nieboer (Chromium in natural and human environment; John Wiley & Sons, New York, Chapter 6, 1994), chromium chemicals are manufactured by oxidising chromium(III) to chromium(VI). This is conventionally done by pulverizing the ore in a ball mill to less than 200 mesh size, mixing the pulverized ore with soda ash and lime and roasting the mixture in rotary kiln at 1100–1150° C. to obtain a molten roast. The molten roast thus obtained is then leached to extract the water-soluble sodium chromate. The lime added during the step of roasting reacts with aluminium, which is present in the ore and prevents it from dissolving when the roast is leached. A counter-current leach process is employed. The liquor released from the leaching process is a deep yellow solution, saturated with sodium chromate. The sodium chromate is either dried by conventional drying methods or converted by acidification and crystallization into the desired product, for example, into crystalline sodium dichromate. The solid material remaining after the leaching is the Chromite Ore Processing Residue.

COPR when disposed off without adequate precaution continues to leach chromate salts for decades. The total chromium content in the COPR on the residue weight can be as high as 10% and slowly solubilizing chromate compounds are present at concentrations of 0.7–5% in the COPR. Bartlett (Environmental Health Perspectives, 92, 17, 1991) reports that the soluble chromium (VI) compounds present in the COPR are known carcinogens.

The Chromite Ore Processing Residue (COPR) is a complex mixture of chromite ore, lime and soda ash. Disposal of COPR as landfills has produced areas of contaminated land across the world. Ground water from these sites can be highly contaminated with Cr (VI). Some of the residual water-soluble chromium compounds in the residue have relatively low degree of solubility and bleed very slowly, hence cannot be readily leached to exhaustion. Nevertheless, the water-soluble chromium compounds have sufficient solubility to pollute the environment by bleeding long after the residue has been discarded. Hursthouse (Journal of Environmental Monitoring, 3, 49, 2001) reports that areas like Glasgow in Scotland, where COPR was left behind in early 1960's continue to release chromium. To stock pile these residues under conditions that they could not be wetted would be difficult and expensive.

Burke et al. (Environmental Health Perspectives, 92, 131, 1991) report that the slowly bleeding chromium compounds present in the residue obtained in the manufacture of chromium chemicals from chromite ore include calcium chromate, $CaCrO_4$, and calcium alumino-chromate, $3CaO.Al_2O_3.CaCrO_4.12H_2O$, which are very slowly soluble in water, tribasic calcium chromite, $Ca_3(CrO_4)_2$ which decomposes slowly in the presence of water to produce water-soluble hexavalent chromium and insoluble trivalent chromium hydroxide; and basic ferric chromate, $Fe(OH)CrO_4$, which hydrolyses slowly in water to release chromate ions. The use of lime encapsulates chromium with calcium sulfate thus preventing its oxidation/subsequent extraction. The waste residue also contains some trivalent chromium compounds, but these are soluble to a lesser extent only. Mineralogical studies of soils and sediments contaminated by chromite ore processing residues (COPR) indicates three distinct categories of minerals—unreacted feedstock (chromite), high temperature phases produced during chromium extraction (brownmillerite, periclase and larnite), and finally, minerals formed under ambient weathering conditions, on the disposal sites (brucite, calcite, aragonite, ettringite, hydrocalumite, hydrogarnet) as reported by Meegoda et al (Practice Periodical of Hazardous, Toxic and Radioactive Waste Management, 4, 7, 2000).

Several common remediation strategies are available for the management of chromium disposed off as landfills. Gancy and Wamser (U.S. Pat. No. 3,937,785, 1976) suggested the reduction of particle size of chromite ore processing residues such that at least 20 percent of the residue passes through a 200 mesh sieve to reduce the bleeding of water soluble chromium compounds from the residue. The water soluble chromium compounds are generally present only to the extent of 10–15% of the total chromium in the residue. Weathering conditions and various compounds present in the soil would continue to enable, the leaching of chromium from these residues with time.

Kapland et al. (U.S. Pat. No. 4,504,321, 1985) suggested the stabilization of the ore residue with sludge dredged from salty or brackish water to obtain a hardened mass. It was presumed that the impermeable layer around the residue would prevent the leaching of chromium when exposed to weathering conditions. However, the potential threat of chromium leaching from dumpsites containing such residues still persist as the impermeable layer can crack under natural climatic cycles.

The management of ore residue by possible conversion of chromium (VI) to chromium (III) has been a subject matter of discussion for long. Situ et al. (U.S. Pat. No. 5,395,601 1995) suggested the admixing of the residue with blast furnace coke for reducing chromium (VI), while the use of ferrous sulfate to convert chromium (VI) to chromium (III) has been suggested by Farmer et al. (Environmental Geochemistry and Health, 21, 331, 1999).

Technologies for immobilization are generally judged by the following criteria:
  a) the ability to reduce hexavalent chromium to trivalent chromium and at the same time prevent its reversal back to hexavalent chromium and
  b) the ability to demonstrate long term and low toxic metal leaching characteristics of the end product which these methods may seem lacking to satisfy.

The immobilized chromium from all the above technologies ultimately end up as landfills. There are evidences for chromium cycling in soil as demonstrated by Bartlett (Environmental Health Perspectives, 92, 17, 1991) where chromium (III) can be oxidized to chromium (VI) by other compounds present in soil and subsequently enter the food cycle.

In an effort to minimize the risk of exposure to the public, regulatory authorities are now demanding the cleanup of chromium-contaminated water and soils. Vitrification or making glass out of wastes, immobilizes the chromium in the glass. Meegoda et al. (Practice Periodical of Hazardous, Toxic, and Radioactive waste management, 4, 89, 2000) has employed cold top vitrification technology to immobilize chromium from ore residues. This technology proposes the use of the vitrified product in highway construction industry. The success of this technology would lie in the effective immobilization of chromium in a siliceous matrix and use of the product by the construction industry.

Despite many years of researching alternatives, landfill is still the world-wide industry standard today. The larger western world factories are located close to existing or historic clay mining operations normally involved in refractory brick manufacture. Such plants generate approximately 1 ton of treated mineral waste per ton of rated sodium chromate capacity employed, typically containing 8–12% $Cr_2O_3$. High-lime process plants operating today collectively generate an estimated 600 kt $y^{-1}$ of mineral waste. Darrie (Environmental Geochemistry and Health, 23, 187, 2001) suggests that the challenge of successful treatment of high-lime process waste is considerably greater since it typically contains 20–40% calcium oxide equivalent together with salts of iron. The industry is more than 170 years old and the inability to landfill mineral waste has been the single most significant factor dictating factory closures.

Sreeram and Ramasami (Journal of Environmental Monitoring, 3, 526, 2001) had reported characterization of the chromite ore processing residues and attempted to recover chromium from such residues through chelative and oxidative extraction procedures. The chromium in the residue exists in various phases which can be broadly classified under exchangeable, carbonate bound, Fe—Mn oxide bound or reducible, oxidizable and residual chromium. While chromium in the exchangeable, oxidizable and carbonate bound forms are easily discharged into the immediate environment, the reducible and residual chromium are not easily discharged. The reducible chromium and residual chromium phases are formed either during the high temperature roasting of the ore or from the unreacted ore. The chromium in these phases are encapsulated within the calcium matrix.

The major limitation associated with this extraction method is that only a maximum of 70% recovery of a mixture of chromium and iron is possible by chelative extraction. Also, the process requires repetitive extraction cycles making it cumbersome. The oxidative extraction process necessitates use of sodium peroxide, a designated explosive generating large quantities of heat on contact with water, along with sodium hydroxide for an economical recovery of chromium (>70%). The associated risk of using sodium peroxide in large-scale use has obviously been a limiting factor.

Sreeram and Ramasami teaches a process wherein sodium peroxide is added along with sodium hydroxide to the COPR. In this case, sodium peroxide would react with water in the residue to generate hydrogen peroxide, an oxidant. The reaction proceeds as follows:

$$Na_2O_2 + 2H_2O \rightarrow 2NaOH + H_2O_2$$

It is a well known fact that hydrogen peroxides are unstable and the disproportionation of the same is fast in the presence of alkali. The reaction proceeds as follows:

$$H_2O_2 \rightarrow H_2O + \tfrac{1}{2}H_2O$$

The melting point of sodium peroxide is 600° C. and hence, for this reaction to occur, a temperature above 500° C. is essential.

Also, it should be noticed that in the presence of water, sodium peroxide results in the generation of 142 kJ/mol of heat. Sodium peroxide is corrosive on metals and cannot be used in kilns, rotary kilns etc. It is highly irritating to the eyes, skin and mucous membrane and hence its use in industrial application is limited. Further, the dissociation of peroxide to yield hydrogen peroxide which in turn disproportionates to water slows down the rate of reaction and results in the addition of larger quantities of alkali and oxidant that is required for the stoichiometric conversion of Cr(III) to Cr(IV). Further, commercial sodium peroxide contains $Fe_2O_3$ as contaminant and this would add to the residue left over after chromium extraction. Finally, to the best of the Inventor's knowledge, no other prior art is available on the recovery of chromium and iron from the COPR.

OBJECTS OF THE INVENTION

The main objective of the present invention is to provide a process for simultaneous recovery of chromium and iron from the Chromite Ore Processing Residue (COPR) which obviates the limitations as stated above.

Another objective of the present invention is to provide a process for rendering non-leachable chromium compounds leachable, thereby enabling a near complete extraction of chromium from chromic residues.

Yet another objective of the present invention is to remove all metals present to any significant extent in the residue such that the remaining material can be safely be disposed off.

Still another objective of the present invention is to provide a process for more than 90% recovery of chromium and iron from COPR.

Yet another objective of the present invention is to provide a simple eco-friendly and cost effective process for the simultaneous recovery of chromium and iron.

SUMMARY OF THE INVENTION

The present invention relates to a process for simultaneous recovery of chromium and iron from Chromite Ore Processing Residue (COPR) and more particularly, the present invention relates to an economical and environment-friendly process for recovering chromium as a chromate salt and iron as an iron salt from the Chromite Ore Processing Residue through the creation of microexplosions within the reaction medium thereby exposing the occluded chromium.

DETAILED DESCRIPTION OF THE PRESENT INVENTION

Accordingly, the present invention provides a process for simultaneous recovery of chromium and iron from Chromite Ore Processing Residue (COPR), said process comprising the steps of:
i) treating the COPR with not less than 20% w/w, of a metal hydroxide at a temperature not less than 350° C. for a time period not less than 10 minutes under atmospheric condition to form a grog;
ii) subjecting the grog of step (i) to aqueous leaching at a temperature in the range of from 30–100° C. to form a suspension;

iii) separating the suspension of step (ii) to obtain a chromate solution and an iron rich residue;
iv) drying the chromate solution of step (iii) to obtain chromate salt in powder form;
v) dissolving the iron rich residue of step (iii), with not less than 20% w/w, of a mineral acid at a temperature in the range of from 30–120° C. for a period of not less than 5 minutes;
vi) treating the mineral acid of step (v) with sodium sulfate to obtain a suspension;
vii) separating the suspension of step (vi) to obtain an iron solution and a solid residue;
viii) discarding the solid residue and adjusting the pH of the iron solution of step (vii) to 2–4, and
ix) drying the iron solution of step (viii), to obtain iron salt in powder form.

In an embodiment of the present invention, the Chromite Ore Processing Residue (COPR) is non-leachable Chromite Ore Processing Residue (COPR).

In another embodiment of the present invention, the metal hydroxide is selected from the group consisting of sodium hydroxide, potassium hydroxide or lithium hydroxide.

In still another embodiment of the present invention, wherein in step (i) the COPR is treated with the metal hydroxide optionally in the presence of an oxidant.

In yet another embodiment of the present invention, the oxidant is selected from the group consisting of sodium nitrite, sodium perborate, sodium chlorate either individually or in combination.

In one more embodiment of the present invention, wherein in step (ii) the amount of water used for leaching the grog is in the range of 1:0.01 to 1:1 w/w.

In one another embodiment of the present invention, wherein the mineral acid is selected from the group consisting of hydrochloric acid, sulfuric acid, phosphoric acid, perchloric acid either individually or in combination.

In a further embodiment of the present invention, the drying of the chromate solution and/or the iron solution is optionally carried out at a temperature of from 130–260° C.

The process of the present invention is described below in detail and in the examples which are provided by way of illustration only and therefore should not be construed to limit the scope of the present invention.

The ore residue is treated with not less than 20% w/w, of a metal hydroxide at a temperature not less than 350° C. for a time period not less than 10 minutes under atmospheric condition, optionally in the presence of not more than 300% w/w, of a known oxidant to form a grog. It is then subjected to aqueous leaching by known method at a temperature in the range of 30–100° C. to form a suspension, which is then subjected to separation by known method to obtain the chromate solution. It is dried by known method and optionally at a temperature in the range of 130–260° C. to obtain chromate salt in powder form.

The separated residue is treated with not less than 20% w/w, of a mineral acid at a temperature in the range of 30–120° C. for a period of not less than 5 minutes to obtain a solution, which is then treated with sodium sulfate and subsequently subjected to separation by known method to obtain the iron solution followed by adjusting pH of the solution to 2–4 by known method. The solution is dried by known method and optionally at a temperature in the range of 130–260° C. to obtain iron salt in powder form.

Sodium hydroxide for example melts at 300° C. and penetrates into the cavities in the COPR aggregates and reacts with chromium (III) to form chromium (IV). Mild oxidants are optionally added to break down the surface of the aggregates to facilitate penetration of sodium hydroxide into the aggregates and oxidation of chromium (III) to chromium (IV). The oxidant is beneficial if the aggregates contain large quantities of unreacted ore or calcium compounds.

The novelty and non-obviousness of the present invention lies in the treatment of the chromite ore processing residue with metal hydroxide under specific conditions, as herein described, to convert the non-leachable chromium and iron compounds leachable through the creation of microexplosions within the reaction medium thereby exposing the occluded chromium, resulting in their near complete recovery, thereby providing a cost effective as well as environment friendly option for utilizing the said residue, which is otherwise hazardous, in an effective manner.

Thus the present invention essentially differs from the process of Sreeram and Ramaswami by way of subjecting the gorge to oxidation using only sodium hydroxide thereby avoiding $Na_2O_2$ which in turn facilitates solid-solid reaction. Even the optional oxidants are chosen in such a way that no water is formed as by-product. Thus the absence of any water phase in the system ensures that the reaction rate is not retarded.

It should be further noticed that no additional contaminants such as $Fe_2O_3$ are added up from the oxidants used in the reaction to the system. The yield of the reaction is enhanced by the fact that molten sodium hydroxide is able to penetrate into the microcavities in the aggregates react with chromium (III) sites. The sodium hydroxide also reacts with iron to form iron hydroxides at this stage resulting in a complete breakdown of aggregates. The ability of sodium hydroxide to melt at low temperatures and penetrate into the aggregates and react have utilized for the first time for obtaining enhanced yield of chromium (IV). The extent of availability of sodium hydroxide at the reaction sites is the rate determining step.

EXAMPLE 1

To one gram of chromite ore processing residue one gram of sodium hydroxide was added in a silica crucible and then heated to 600° C. in an electric Bunsen for 90 minutes to form a grog. The grog was then cooled naturally to 35° C. and leached with 100 mL of water. The leachate was filtered through a Whatmann filter paper No. 1 and the leached sodium chromate solution was dried in an air oven to obtain crystals of sodium chromate. The residue left behind in the filter paper was dried, mixed with 0.2 g of hydrochloric acid in a 100 mL beaker and heated to 60° C. for 25 minutes, whereby the residue significantly goes into solution. The solution was then treated with 0.5 g of sodium sulfate and left for 12 hours to precipitate calcium sulfate. The solution was then decanted, neutralized with 1.0 g of sodium sulfite to pH 3.0 and drum dried to obtain iron sulfate salt. The percentage efficiency of extraction of chromium from the residue was calculated to be 96% and the purity of sodium chromate 90%. Efficiency of extraction of iron was calculated to be 96%.

EXAMPLE 2

To one gram of chromite ore processing residue one gram of potassium hydroxide was added in a silica crucible and the mixture was then heated to 600° C. in an electric Bunsen for 30 minutes to obtain a grog. The grog was then cooled naturally to 35° C. and leached with 100 mL of water. The leachate was filtered through a Whatmann filter paper No. 1 and the leached chromate solution was dried in an air oven to obtain crystals of sodium chromate. The residue left behind in the filter paper was dried, mixed with 0.2 g of sulfuric acid in a 100 mL beaker and heated to 60° C. for 15 min., whereby the residue significantly goes into solution. The solution was then treated with 0.5 g of sodium sulfate and left for 12 hr to precipitate calcium sulfate. The solution was then filtered, neutralized with 1.0 g of sodium sulfite to pH 3.0 and drum dried to obtain iron sulfate salt. The efficiency of extraction of chromium from the residue was found to be 93% and the purity of sodium chromate 90%. Efficiency of extraction of iron was calculated as 90%.

EXAMPLE 3

To one gram of chromite ore processing residue one gram of lithium hydroxide was mixed in a crucible and the mixture heated to 600° C. in an electric Bunsen for 60 minutes to obtain a grog. The grog was then cooled naturally to 35° C. and leached with 100 mL of water. The leachate was filtered through a Whatmann filter paper No. 1 and the leached chromate solution was dried in an air oven to obtain crystals of sodium chromate. The residue left behind in the filter paper was dried, mixed with 0.2 g of sulfuric acid in a 100 mL beaker and heated to 60° C. for 15 minutes, whereby the residue significantly goes into solution. The solution was then treated with 0.5 g of sodium sulfate and left for 12 hours to precipitate calcium sulfate. The solution was then decanted, neutralized with 1.0 g of sodium sulfite to pH 3.0 and drum dried to obtain iron sulfate salt. The percentage efficiency of extraction of chromium from the residue was calculated to be 83% and the purity of sodium chromate 90%. Efficiency of extraction of iron was calculated to be 91%.

EXAMPLE 4

One gram of Chromite Ore Processing Residue along 0.5 g of sodium hydroxide and 0.2 g of sodium nitrite were taken in a silica crucible and the mixture was heated to 600° C. in an electric Bunsen for 60 minutes to obtain grog. The treated grog was cooled naturally to 45° C. and leached with 10 mL of water. The leachate was centrifuged in a basket centrifuge and the leached chromate solution was dried in an air oven to obtain crystals of sodium chromate. The residue left behind was dried, mixed with 0.3 g of sulfuric acid in a 100 mL beaker and heated to 50° C. for 20 minutes, whereby the residue significantly goes into solution. The solution was then treated with 0.5 g of sodium sulfate and left for 3 hours to precipitate calcium sulfate. The solution was then filtered, neutralized with 1.0 g of sodium sulfite to pH 3.0 and drum dried to obtain iron sulfate salt. The percentage efficiency of extraction of chromium from the residue was calculated to be 97% and the purity of sodium chromate 93%. Efficiency of extraction of iron was calculated as 93%.

EXAMPLE 5

One gram of chromite ore processing residue was mixed with 0.3 g of sodium hydroxide, 0.8 g of sodium nitrite and 2.2 g of sodium perborate in a ceramic crucible and the mixture was heated to 350° C. in an electric Bunsen for 20 minutes. The treated grog was cooled naturally to 60° C. and leached with 10 mL of water. The leachate was filtered through a filter press and the leached chromate solution was dried in an air oven to obtain crystals of sodium chromate. The residue left behind was dried, mixed with 0.4 g of phosphoric acid in a 100 mL beaker and heated to 80° C. for 35minutes, whereby the residue significantly goes into solution. The solution was then treated with 1.5 g of sodium sulfate and left for 14 hours to precipitate calcium sulfate. The solution was then decanted, neutralized with 1.6 g of sodium sulfite to pH 3.0 and drum dried to obtain iron sulfate salt. The percentage efficiency of extraction of chromium from the residue was calculated to be 98% and the purity of sodium chromate 90%. Efficiency of extraction of iron was calculated to be 92%.

EXAMPLE 6

One gram of chromite ore processing residue along 1.8 g of sodium hydroxide and 0.2 g of sodium nitrite was taken in a ceramic crucible and the mixture was heated to 400° C. in an electric Bunsen for 10 minutes to obtain grog. The treated grog was cooled naturally to 60° C. and leached with 30 mL of water. The leachate was filtered through a filter press, the leached chromate solution was dried in an air oven to obtain crystals of sodium chromate. The residue left behind was dried, mixed with 0.4 g of perchloric acid in a 100 mL beaker and heated to 80° C. for 5 minutes, whereby the residue significantly goes into solution. The solution was then treated with 1.5 g of sodium sulfate and left for 14 hours to precipitate calcium sulfate. The solution was then decanted, neutralized with 2.8 g of sodium sulfite to pH 4.0 and drum dried to obtain iron sulfate salt. The percentage efficiency of extraction of chromium from the residue was calculated to be 98% and the purity of sodium chromate 90%. Efficiency of extraction of iron was calculated as 94%.

EXAMPLE 7

100 g of chromite ore processing residue was admixed with 100 g of sodium hydroxide in a rotary kiln and the mixture was heated to 400° C. for 30 minutes to obtain grog. The treated grog was cooled naturally to 45° C. and leached with 1 L of water. The leachate is passed through a basket centrifuge and the leached sodium chromate solution is dried in a drum drier to obtain crystals of sodium chromate. The residue left behind was dried, mixed with 100 g of hydrochloric acid in a 1 L beaker and heated to 120° C. for 15 minutes, whereby the residue significantly goes into solution. The solution was treated with 100 g of sodium sulfate and left for 12 hours to precipitate calcium sulfate. The solution was decanted, neutralized with 80 g of sodium sulfite to pH 3.0 and drum dried to obtain iron sulfate salt. The percentage efficiency of extraction of chromium from the residue was calculated to be 96% and that of iron sulfate 90% and the purity of sodium chromate 90%.

EXAMPLE 8

To one gram of chromite ore processing residue 0.6 g of sodium hydroxide and 0.8 g of sodium nitrate were added in a ceramic crucible and then heated to 600° C. in an electric Bunsen for 60 minutes to form a grog. The grog was then cooled naturally to 60° C. and leached with 30 mL of water. The leachate was filtered through a Whatmann filter paper No. 1 and the leached sodium chromate solution was concentrated in a water bath at 90° C. and to this 0.7 g of concentrated sulfuric acid was added to generate sodium dichromate. The residue left behind was air dried, mixed with 0.5 g of hydrochloric acid in a 50 mL beaker and heated to 80° C. for 15 minutes, whereby the residue significantly goes into solution. The solution was then treated with 1.5 g of sodium sulfate and left for 24 hours to precipitate calcium sulfate. The solution was then decanted, neutralized with 1.8 g of sodium sulfite to pH 3.0 and dried in an air oven to obtain iron sulfate salt. The percentage efficiency of extraction of chromium from the residue was calculated to be 97% and the purity of sodium dichromate obtained was 95%. The percentage recovery of iron was calculated as 95%.

EXAMPLE 9

To one gram of chromite ore processing residue 1 g of sodium hydroxide and 0.2 g of sodium nitrate were added in a ceramic crucible and then heated to 500° C. in an electric Bunsen for 60 minutes to form a grog. The grog was then cooled naturally to 60° C. and leached with 50 mL of water. The leachate was filtered through a Whatmann filter paper No. 1 and the leached sodium chromate solution was concentrated in a water bath at 90° C. and to this 1.2 g of concentrated sulfuric acid was added to generate sodium dichromate. The residue left behind was air dried, mixed with 0.4 g of hydrochloric acid in a 50 mL beaker and heated to 80° C. for 15 minutes, whereby the residue significantly goes into solution. The solution was then treated with 1.5 g of sodium sulfate and left for 24 hours to precipitate calcium sulfate. The solution was then decanted, neutralized with 1.8 g of sodium sulfite to pH 3.0 and dried in an air oven to obtain iron sulfate salt. The percentage efficiency of extraction of chromium from the residue was calculated to be 96% and the purity of sodium dichromate obtained was 96%. The percentage recovery of iron was calculated as 94%.

The advantages of the present invention are:
1. The recovery process carried out in the present invention enables more than 80% recovery of chromium and iron from chromite ore processing residue which otherwise are left for dumping on land or get accumulated in secured landfills and have been declared by many countries as hazardous.
2. The process of the present invention enables the recovery of chromium from residual and reducible phases of chromium in the COPR by converting the non-leachable chromium into leachable forms through the creation of microexplosions within the reaction medium thereby exposing the occluded chromium.
3. The obtained chromate and iron salts are more than 90% pure and can be used in any conventional manner in the manufacture of chromium and iron based chemicals.
4. The chromate, recovered by the process of the present invention, can be converted into dichromate, which has multifarious uses in various industries.
5. The present invention is ideal for industries manufacturing chromium chemicals from chromite ore as it employs reaction conditions similar to that employed for manufacture of chromium chemicals and can be easily be implemented.
6. The present invention provides for a complete solution to the problem of tackling hazardous chromium wastes from chromite ore processing residues, for which immobilization and secured land filling was the only option.
7. The process of the present invention provides for the separation of other compounds, containing predominantly silica and calcium which can be employed in the construction industry or can be safely used as landfills as they are non-hazardous.
8. The remaining residue, generated out of the process of the present invention, is not amenable to further significant physical, chemical and biological changes and is neither a pollutant for the environment nor is hazardous to human health.

The invention claimed is:

1. A process for simultaneous recovery of chromium and iron from chromite ore processing residue (COPR), said process comprising the steps of:
i) treating the COPR with not less than 20% w/w, of a metal hydroxide at a temperature not less than 350° C. for a time period not less than 10 minutes under atmospheric condition to form a grog;
ii) subjecting the grog of step (i) to aqueous leaching at a temperature in the range of from 30–100° C. to form a suspension;
iii) separating the suspension of step (ii) to obtain a chromate solution and an iron rich residue;
iv) drying the chromate solution of step (iii) to obtain chromate salt in powder form;
v) dissolving the iron rich residue of step (iii), with not less than 20% w/w, of a mineral acid at a temperature in the range of from 30–120° C. for a period of not less than 5 minutes;
vi) treating the mineral acid of step (v) with sodium sulfate to obtain a suspension;
vii) separating the suspension of step (vi) to obtain an iron solution and a solid residue;
viii) discarding the solid residue and adjusting the pH of the iron solution of step (vii) to 2-4, and
ix) drying the iron solution of step (viii), to obtain iron salt in powder form.

2. A process as claimed in claim 1, wherein the COPR is non-leachable COPR.

3. A process as claimed in claim 1, wherein the metal hydroxide is selected from the group consisting of sodium hydroxide, potassium hydroxide and lithium hydroxide.

4. A process as claimed in claim 1, wherein in step (i) the COPR is treated with the metal hydroxide in the presence of an oxidant.

5. A process as claimed in claim 3, wherein the oxidant is selected from the group consisting of sodium nitrite, sodium perborate, sodium chlorate, and combinations thereof.

6. A process as claimed in claim 1, wherein in step (ii) the amount of water used for leaching the grog is in the water to grog ratio range of from 1:0.01 to 1:1 w/w.

7. A process as claimed in claim 1, wherein the mineral acid is selected from the group consisting of hydrochloric acid, sulfuric acid, phosphoric acid, perchloric acid, and combinations thereof.

8. A process as claimed in claim 1, wherein at least one of the drying of the chromate solution or the iron solution is carried out at a temperature of from 130–260° C.

* * * * *